(12) United States Patent
Dunn et al.

(10) Patent No.: US 9,169,944 B1
(45) Date of Patent: Oct. 27, 2015

(54) VALVE-IN HEAD IRRIGATION SPRINKLER WITH SERVICE VALVE

(71) Applicant: Hunter Industries, Inc., San Marcos, CA (US)

(72) Inventors: Richard M. Dunn, Carlsbad, CA (US); Santo Uccello, San Marcos, CA (US); Sean A. O'Neill, Escondido, CA (US)

(73) Assignee: Hunter Industries, Inc., San Marcos, CA (US)

( * ) Notice: Subject to any disclaimer, the term of this patent is extended or adjusted under 35 U.S.C. 154(b) by 521 days.

(21) Appl. No.: 13/680,326

(22) Filed: Nov. 19, 2012

(51) Int. Cl.
| | |
|---|---|
| *B05B 3/04* | (2006.01) |
| *F16K 43/00* | (2006.01) |
| *A01G 25/16* | (2006.01) |
| *B05B 12/00* | (2006.01) |
| *B05B 1/30* | (2006.01) |
| *B05B 7/12* | (2006.01) |
| *B05B 1/26* | (2006.01) |

(52) U.S. Cl.
CPC .............. *F16K 43/005* (2013.01); *A01G 25/16* (2013.01); *B05B 1/26* (2013.01); *B05B 1/3013* (2013.01); *B05B 1/3026* (2013.01); *B05B 3/0418* (2013.01); *B05B 3/0422* (2013.01); *B05B 7/1209* (2013.01); *B05B 12/00* (2013.01); *Y10S 239/15* (2013.01)

(58) Field of Classification Search
CPC .... B05B 12/00; B05B 3/0422; B05B 3/0418; B05B 1/3013; B05B 7/1209; B05B 1/3026; B05B 1/26; F16K 43/005; A01G 25/16; Y10S 239/01; Y10S 239/15

USPC .......... 239/69, 203, 204, 205, 237, 240, 562, 239/569, 574, 580, DIG. 1, DIG. 15; 137/329.01

See application file for complete search history.

(56) References Cited

U.S. PATENT DOCUMENTS

| | | | |
|---|---|---|---|
| 4,913,351 A * | 4/1990 | Costa | ............................ 239/203 |
| 5,058,806 A | 10/1991 | Rupar | |
| 5,288,022 A | 2/1994 | Sesser | |
| 5,375,768 A | 12/1994 | Clark | |
| 5,423,486 A | 6/1995 | Hunter | |
| 5,456,411 A | 10/1995 | Scott et al. | |
| 5,556,036 A | 9/1996 | Chase | |
| 5,699,962 A | 12/1997 | Scott et al. | |
| 5,711,486 A | 1/1998 | Clark et al. | |
| 5,720,435 A | 2/1998 | Hunter | |
| 5,762,270 A | 6/1998 | Kearby et al. | |
| 5,918,812 A | 7/1999 | Beutler | |
| 5,927,607 A | 7/1999 | Scott | |
| 5,979,482 A | 11/1999 | Scott | ............................... 137/15 |
| 5,988,523 A | 11/1999 | Scott | |
| 5,996,608 A | 12/1999 | Hunter et al. | .................. 137/244 |

(Continued)

*Primary Examiner* — Steven J Ganey
(74) *Attorney, Agent, or Firm* — Knobbe, Martens, Olson & Bear, LLP

(57) ABSTRACT

An irrigation sprinkler includes a main valve mounted in the lower end of an outer housing for controlling the flow of water through an inlet of the outer housing. A pilot valve is operatively coupled to the main valve for turning the main valve ON and OFF. A solenoid is operatively coupled to the pilot valve for opening and closing the pilot valve. A service valve is operatively coupled between the main valve and the pilot valve. The service valve is manually actuable from an AUTO state to allow normal operation of the sprinkler and to an OFF state to allow repair or replacement of the pilot valve or solenoid without having to manually shut OFF a supply valve that is coupled to the inlet of the outer housing through a supply pipe.

20 Claims, 20 Drawing Sheets

(56) References Cited

U.S. PATENT DOCUMENTS

| | | | |
|---|---|---|---|
| 6,042,021 A | 3/2000 | Clark | |
| 6,050,502 A | 4/2000 | Clark | |
| 6,082,632 A | 7/2000 | Clark et al. | |
| 6,138,924 A | 10/2000 | Hunter et al. | 239/204 |
| 6,227,455 B1 | 5/2001 | Scott et al. | |
| 6,241,158 B1 | 6/2001 | Clark et al. | |
| 6,244,521 B1 | 6/2001 | Sesser | |
| 6,299,075 B1 | 10/2001 | Koller | |
| 6,457,656 B1 | 10/2002 | Scott | |
| 6,491,235 B1 | 12/2002 | Scott et al. | 239/206 |
| 6,499,672 B1 | 12/2002 | Sesser | |
| 6,651,905 B2 | 11/2003 | Sesser et al. | |
| 6,688,539 B2 | 2/2004 | Vander Griend | |
| 6,695,223 B2 | 2/2004 | Beutler et al. | |
| 6,736,332 B2 | 5/2004 | Sesser et al. | |
| 6,808,127 B2 * | 10/2004 | McNulty et al. | 239/569 |
| 6,817,543 B2 | 11/2004 | Clark | |
| 6,854,664 B2 | 2/2005 | Smith | |
| 6,871,795 B2 | 3/2005 | Anuskiewicz | |
| 6,957,782 B2 | 10/2005 | Clark et al. | |
| 7,032,836 B2 | 4/2006 | Sesser et al. | |
| 7,040,553 B2 | 5/2006 | Clark | |
| 7,159,795 B2 | 1/2007 | Sesser et al. | |
| 7,240,860 B2 | 7/2007 | Vander Griend | |
| 7,287,711 B2 | 10/2007 | Crooks | |
| 7,303,147 B1 | 12/2007 | Danner et al. | 239/203 |
| 7,322,533 B2 | 1/2008 | Grizzle | |
| 7,503,346 B1 | 3/2009 | Clark | 137/625.64 |
| D593,182 S | 5/2009 | Anuskiewicz | |
| 7,530,504 B1 | 5/2009 | Danner et al. | |
| 7,611,077 B2 | 11/2009 | Sesser et al. | |
| 7,621,467 B1 | 11/2009 | Garcia | |
| 7,631,813 B1 * | 12/2009 | Lichte et al. | 239/203 |
| 7,677,469 B1 | 3/2010 | Clark | |
| 7,748,646 B2 | 7/2010 | Clark | |
| 7,828,230 B1 | 11/2010 | Anuskiewicz et al. | |
| 7,861,948 B1 | 1/2011 | Crooks | |
| 8,220,723 B2 | 7/2012 | Clark | |
| 8,272,578 B1 | 9/2012 | Clark et al. | |
| 8,282,022 B2 | 10/2012 | Porter | |
| 8,297,533 B2 | 10/2012 | Dunn et al. | |
| 2005/0133619 A1 | 6/2005 | Clark | |
| 2009/0224070 A1 | 9/2009 | Clark et al. | |
| 2011/0024522 A1 | 2/2011 | Anuskiewicz | |
| 2012/0024982 A1 | 2/2012 | Dunn et al. | |
| 2012/0043398 A1 | 2/2012 | Clark | |
| 2012/0132727 A1 | 5/2012 | Dunn et al. | |
| 2012/0234940 A1 | 9/2012 | Clark | |
| 2012/0273593 A1 | 11/2012 | Clark | |

\* cited by examiner

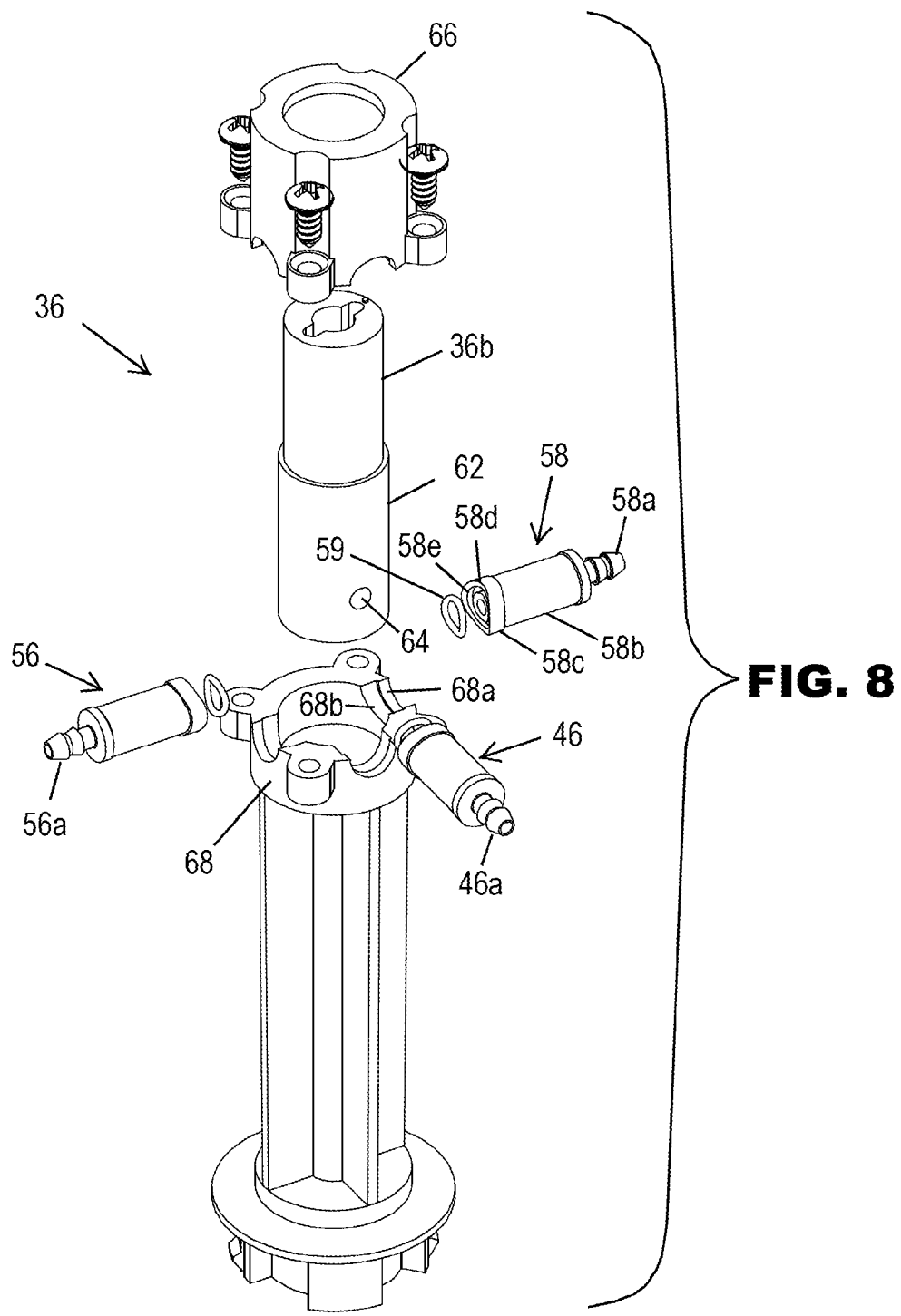

VALVE-IN HEAD IRRIGATION SPRINKLER WITH SERVICE VALVE

CROSS-REFERENCE TO RELATED PATENT

This application is related by subject matter to U.S. Pat. No. 6,491,235 granted Dec. 10, 2002 to Scott et al. and assigned to Hunter Industries, Inc. entitled "Pop-Up Sprinkler with Top Serviceable Diaphragm Valve Module."

FIELD OF THE INVENTION

The present application relates to sprinklers used to irrigate turf, landscaping, golf courses and athletic fields.

BACKGROUND OF THE INVENTION

Many parts of the world do not have adequate rainfall during portions of the year to maintain healthy turf and landscaping. Therefore irrigation systems are used that comprise an electronic irrigation controller that automatically turns valves ON and OFF that supply water to sprinklers installed around an irrigation site.

Pop-up rotor-type sprinklers that have an internal water turbine and gear train reduction for rotating their nozzles have been developed and widely commercialized. A large rotor-type sprinkler commonly used on golf courses includes a diaphragm valve that is mounted adjacent a female threaded inlet in the lower end of the outer housing. This diaphragm valve is opened and closed by a solenoid actuated pilot valve to admit water under high pressure into the outer housing. This pressurized water drives the turbine before being ejected from a removable nozzle carried in a rotating turret at the top of the pop-up riser. The diaphragm valve controls the entry of water into the outer housing of the sprinkler from a pressurized supply pipe to which it is connected. In many cases during the life of a so-called "valve-in-head" sprinkler the diaphragm valve will fail, often due to debris damaging the diaphragm valve seat or clogging the small passages in the diaphragm valve. The thin flexible diaphragm may also wear out. It is then necessary to shut OFF the water supply and dig up the sprinkler so that the defective diaphragm valve components can be repaired, or the sprinkler can be replaced in its entirety. This is a relatively expensive, tedious and time consuming process. Excavation of the defective sprinkler can also cause considerable damage to the surrounding landscaping and prevent golf from being played in the area of the golf course where the repair is taking place.

U.S. Pat. No. 6,491,235 granted Dec. 10, 2002 to Scott et al., and assigned to Hunter Industries, Inc., discloses a top serviceable valve-in-head rotor-type sprinkler with a diaphragm valve module that can be removed and replaced as a single unit after removal of the riser. This eliminates any need to dig up and replace the entire sprinkler. In commercial valve-in-head sprinklers of this type that are manufactured by Hunter Industries, Inc., the solenoid, pilot valve and pressure regulator are mounted inside a valve actuator component assembly housing formed on the side of the sprinkler case and accessible from the top side of the sprinkler. A lid in the large circular ground support flange extending from the top of the case may be opened to gain access to the valve actuator components for service or repair. The solenoid may be manually twisted to close the pilot valve to shut OFF the diaphragm valve to permit nozzle replacement. If maintenance personnel need to repair or replace the diaphragm valve module or any of the valve actuator components, it is necessary to manually shut OFF the supply valve that controls the supply of water to the sprinkler and bleed residual pressurized water in the supply line by running that zone until the water has been exhausted through the sprinkler. In the case where it is only necessary to work on the valve actuator components, the process of shutting off the water source is tedious and time consuming.

BRIEF DESCRIPTION OF THE DRAWINGS

FIG. 8 is an exploded view of the 3-way service valve of FIG. 6.

SUMMARY OF THE INVENTION

In accordance with the present invention an irrigation sprinkler includes an outer housing having an inlet at a lower end thereof. A riser is mounted inside the outer housing for vertical reciprocation through an opening in an upper end of the outer housing. A nozzle is mounted in an upper end of the riser for ejecting a stream of water. A main valve is mounted in the lower end of the outer housing for controlling the flow of water through the inlet. A pilot valve is operatively coupled to the main valve for turning the main valve ON and OFF. A solenoid is operatively coupled to the pilot valve for opening and closing the pilot valve. A service valve is operatively coupled between the main valve and the pilot valve. The service valve is manually actuable from an AUTO state to allow normal operation of the sprinkler and to an OFF state to allow repair or replacement of the pilot valve or solenoid without having to manually shut OFF a supply valve that is coupled to the inlet of the outer housing through a supply pipe.

DETAILED DESCRIPTION

In accordance with the present invention, a valve-in-head sprinkler with a top serviceable valve module is provided with a service valve that can be manually actuated from the top side of the sprinkler. In a first embodiment the service valve is a 3-way valve coupled between the diaphragm valve, the pressure regulator and the pilot valve. The 3-way service valve can be manually actuated to OFF, AUTO and ON states. Manually actuating the 3-way service valve to its OFF state allows the nozzle to be replaced or the valve actuator components to be repaired or replaced without having to shut OFF the supply valve to the sprinkler and without having to bleed the supply pipe. Manually actuating the 3-way service valve to its ON state allows the sprinkler to be tested. Manually actuating the 3-way service valve to its AUTO state allows the sprinkler to operate in its normal intended fashion, i.e. be turned ON and OFF by the irrigation controller.

In a second embodiment of the present invention, the service valve is a 2-way valve that is coupled between the diaphragm valve and the pilot valve. The 2-way service valve may be manually actuated to its OFF state to permit nozzle replacement. Manually actuating the 2-way service valve to its OFF state also allows repair or replacement of the valve actuator components without having to manually shut OFF the supply valve and bleed the supply pipe.

Incorporation of a service valve into a valve-in-head sprinkler in accordance with the present invention eliminates problems with maintaining precise tolerances between the solenoid and the pilot valve otherwise necessary to ensure that the sprinkler can be manually turned ON and OFF simply by twisting the solenoid relative to the pilot valve.

Figure 1:
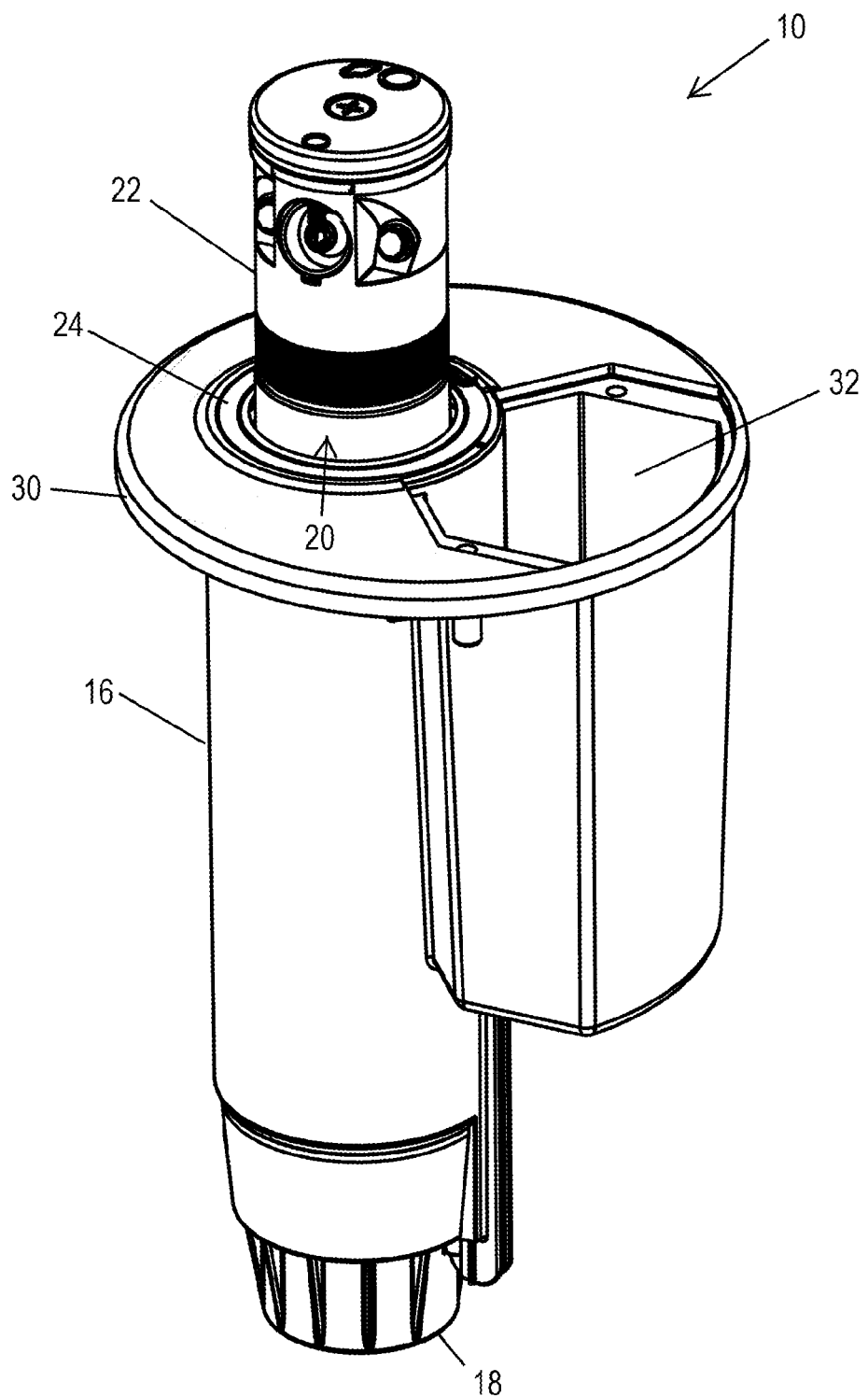
FIG. 1 is an isometric view of a top serviceable sprinkler incorporating a first embodiment of the present invention that utilizes a 3-way service valve.
Figure 4:
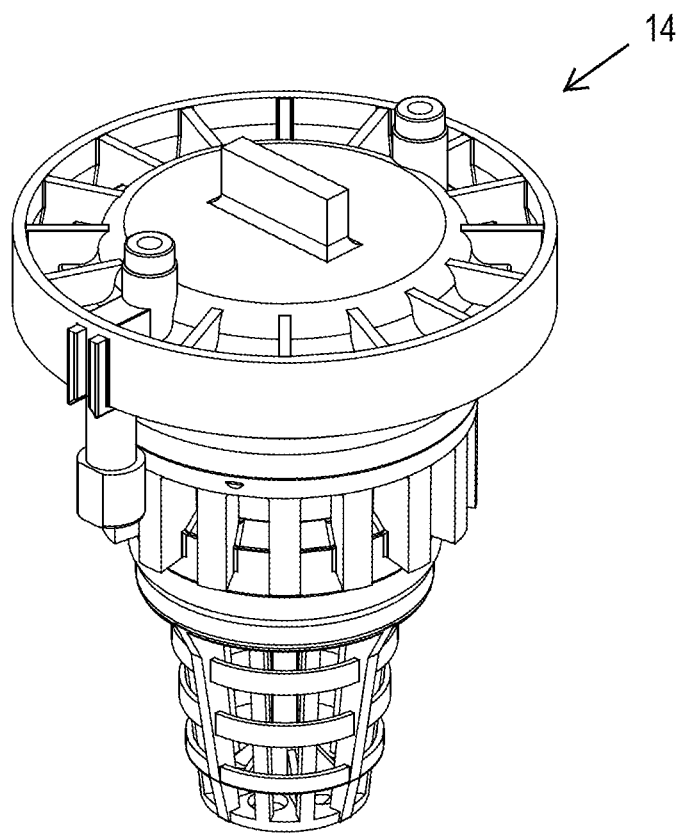
FIG. 4 is an enlarged isometric view of the removable valve module of the sprinkler of FIG. 1.

Referring to FIG. 1 a first embodiment of the present invention takes the form of a pop-up rotor-type sprinkler 10 that includes a surface accessible valve actuator component assembly 12 (FIG. 2) and a top serviceable diaphragm valve module 14 (FIG. 4). Unless otherwise indicated, the parts of the sprinkler 10 are generally made of rigid molded plastic. The sprinkler 10 may have the construction disclosed in U.S. Pat. No. 6,227,455 granted May 8, 2001 to Scott et al. and assigned to Hunter Industries, Inc. entitled "Sub-Surface Sprinkler with Surface Accessible Valve Actuator Components" the entire disclosure of which is hereby incorporated. See also U.S. Pat. No. 6,491,235 granted Dec. 10, 2002 to Scott et al. and assigned to Hunter Industries, Inc. entitled "Pop-Up Sprinkler with Top Serviceable Diaphragm Valve Module" the entire disclosure of which is hereby incorporated.

The sprinkler 10 includes a vertically extending generally cylindrical hollow outer housing 16 (FIG. 1) having a female threaded inlet 18 at its lower end. A male threaded supply pipe (not illustrated) is screwed into the inlet 18 to supply pressurized water to the outer housing 16. The diaphragm valve module 14 (FIG. 2) is located in the lower end of the main housing 16 for admitting water through the inlet 18 into the interior of the housing 16. A tubular riser 20 (FIG. 1) is vertically reciprocable within the interior of the housing 16 when the diaphragm valve module 14 is opened and closed under control of the valve actuator component assembly 12.

Figure 5:
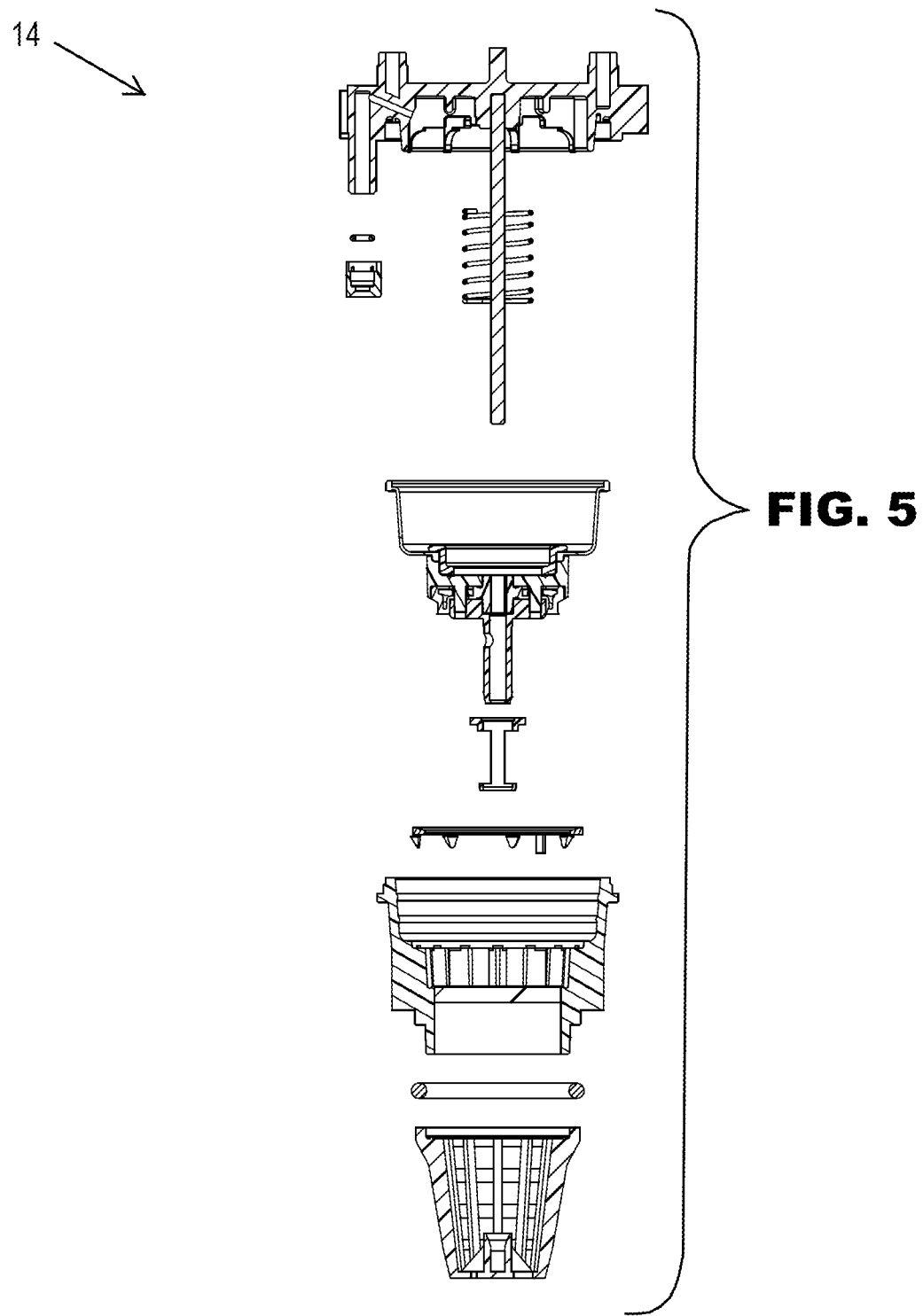
FIG. 5 is an exploded vertical cross-sectional view of the valve module of FIG. 4.

Details of the construction of the diaphragm valve module 14 are illustrated in FIG. 5 and are further disclosed in U.S. Pat. No. 7,303,147 granted Dec. 4, 2007 to Fred M. Danner et al. and assigned to Hunter Industries, Inc. and U.S. patent application Ser. No. 12/732,069 filed by Fred M. Danner et al. on Mar. 25, 2010 and assigned to Hunter Industries, Inc., the entire disclosures of both of which are hereby incorporated by reference. The diaphragm valve module 14 is configured for removal as a unit from the pop-up sprinkler 10 after removal of the riser 20. This allows for convenient repair or replacement of the valve module 14 without having to excavate the sprinkler. The valve seat in the valve module 14 can become damaged due to debris causing undesirable leakage of the sprinkler from its nozzle. The elastomeric diaphragm in the valve module 14 can also become worn and need replacement. In addition it may be desirable to remove rocks from the filter screen removably attached to the lower end of the valve module 14.

A cylindrical nozzle turret 22 (FIG. 1) including a removable nozzle is mounted at an upper end of the riser 20. The riser 20 is held in its retracted position by a riser retraction spring (not illustrated) that surrounds the riser 20 and is held in place by a split containment ring 24 snapped into a groove in the upper end of the housing 16. If desired, the containment ring 24 could be the co-molded type disclosed in U.S. Pat. No. 6,082,632, the entire disclosure of which is hereby incorporated by reference. The riser 20 also contains a water driven turbine (not illustrated) mounted within the riser 20 and coupled to the nozzle turret 22 through a gear train (not illustrated), an arc adjustment mechanism (not illustrated), a reversing mechanism (not illustrated) and a drive shaft (not illustrated) for rotating the nozzle turret 22 back and forth through an adjustable arc. Oscillating arc adjustable turbine driven nozzle rotating mechanisms are well known in the sprinkler art and need not be described herein in detail. See for example U.S. Pat. No. 5,720,435 granted Feb. 24, 1998 to Richard E. Hunter and assigned to Hunter Industries, Inc., the entire disclosure of which is hereby incorporated by reference. An impact drive with a nozzle that is mounted on a vertically reciprocable riser could be used in place of the rotor type riser 20.

Details of other suitable drive assemblies for driving the nozzle turret 22 are disclosed in various patent applications and patents assigned to Hunter Industries, Inc. and need not be described in detail herein. For example, see U.S. patent application Ser. No. 13/343,522 filed Jan. 4, 2012 by Michael L. Clark et al. assigned to Hunter Industries, Inc. entitled "Rotor-Type Irrigation Sprinkler with Coarse and Fine Arc Adjustment" the entire disclosure of which is hereby incorporated by reference. See also U.S. patent application Ser. No. 13/343,456 filed Jan. 4, 2012 by Ronald H. Anuskiewicz et al. assigned to Hunter Industries, Inc. entitled "Planetary Gear Drive Rotor-Type Sprinkler with Adjustable Arc/Full Circle Selection Mechanism" the entire disclosure of which is hereby incorporated by reference. See also U.S. Pat. No. 7,677,469 granted Mar. 16, 2010 to Michael L. Clark and assigned to Hunter Industries, Inc. entitled "Sprinkler with Reversing Planetary Gear Drive" the entire disclosure of which is hereby incorporated by reference.

A circular ground support flange 30 (FIG. 1) extends horizontally and radially outwardly from the upper end of the housing 16. The ground support flange 30 has an off-center riser opening 31 (FIG. 2) that communicates with the upper end of the housing 16 and through which the riser 20 extends. The opening 31 is also circular but it is eccentrically located with respect to the circular ground support flange 30. A generally rectangular, upwardly opening valve actuator component assembly housing 32 (FIG. 1) is connected to an exterior side of the housing 16. Preferably the housing 32 is molded as an integral part of the housing 16. The housing 32 has a removable lid 34 (FIG. 2) that covers an opening at the upper end of the housing 32. The lid 34 aligns with, and effectively forms a part of, the ground support flange 30 when the lid 34 is in its closed position. Preferably the lid 34 does not extend beyond the periphery of the circular ground support flange 30. The valve component housing may be formed with more than one cavity and the lid may be formed to fit over all of the cavities or individual lids may be formed to cover each individual cavity. A groove for the split containment ring 24 extends along the upper end of the outer wall of the housing 32. It is desirable that the ground support flange 30 be circular and that the housing 32 not extend beyond the periphery of the flange 30. This allows maintenance personnel to use specialized circular shaped trimming equipment to keep the turf groomed around the ground support flange 30.

Figure 2:
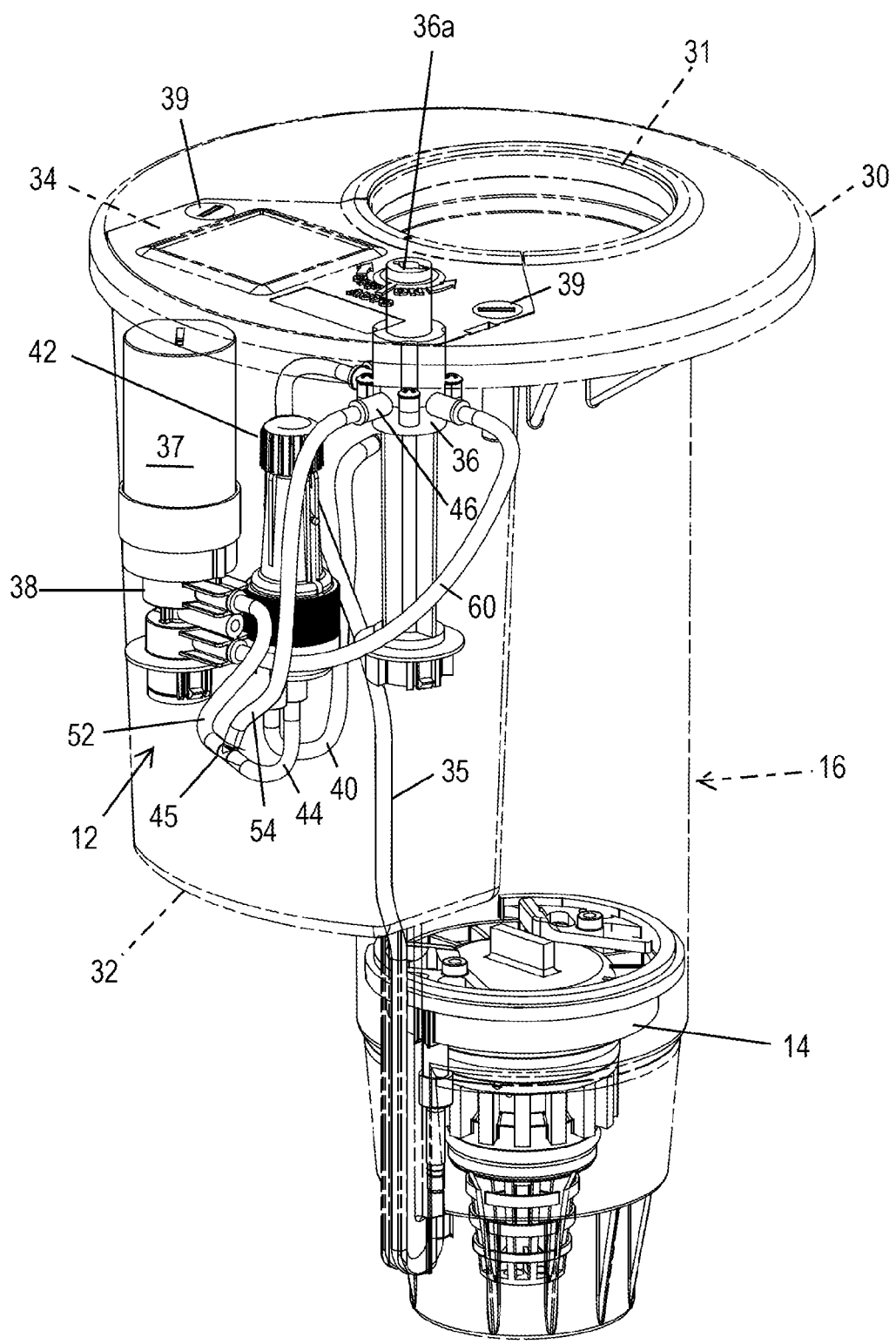
FIG. 2 illustrates the outer case and ground support flange of the sprinkler of FIG. 1 in phantom lines to reveal details of its inner components.
Figure 3:
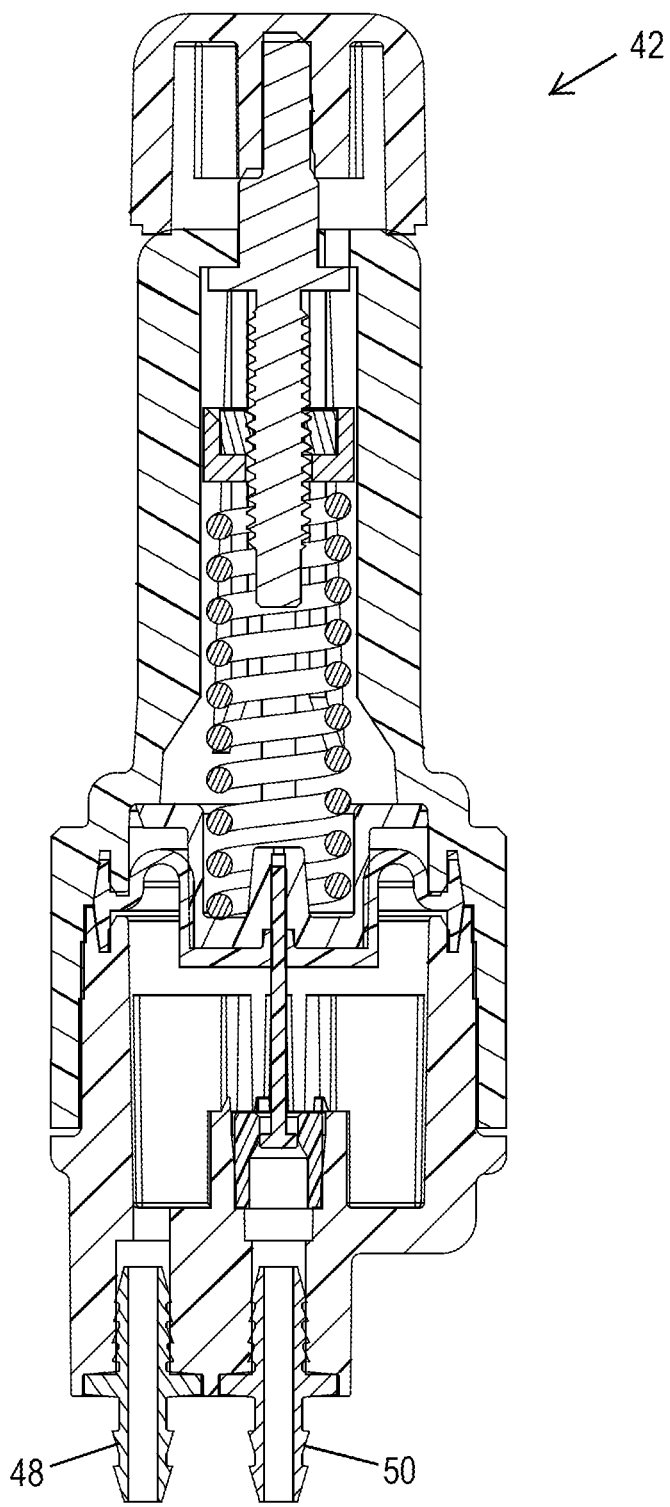
FIG. 3 is an enlarged vertical cross-sectional view of the adjustable pressure regulator of the sprinkler of FIG. 1.

Referring to FIG. 2, the valve actuator component assembly 12 is mounted inside the valve actuator component assembly housing 32. The assembly 12 is operatively connected via hose 35 to the diaphragm valve module 14 through a 3-way service valve 36 for opening and closing the diaphragm valve module 14. The valve actuator component assembly 12 includes the service valve 36, a solenoid 37 and a pilot valve 38. In certain installations, a decoder may also be added to the valve actuator component assembly. The pilot valve 38 sits on a top of a shoulder or stand-off (not illustrated) molded into the bottom of the housing 32. Preferably the pilot valve 38 is locked to the stand-off via a bayonet locking mechanism (not illustrated). A hose 40 connects to a vent fitting (not visible) on the side of the housing 16 and to a first side of an adjustable pressure regulator 42 (FIGS. 2 and 3). Another hose 44 connects a second side of the pressure regulator 42 to the pilot valve 38 through a T-fitting 45 and hose 52. The hose 44 also connects, via the T-fitting 45 and hose 54, the second side of the pressure regulator 42 to a first port 46 of the service valve 36.

The solenoid 37, pilot valve 38 and pressure regulator 42 periodically require service and are therefore made readily accessible to maintenance personnel from above a surface of a bed of soil (not illustrated) in which the housing 16 is planted upon moving the lid 34 to an open position. The lid 34 is removable entirely from the sprinkler 10 by removing screws 39 that are screwed into bores in the housing 32. Yardage numerals for a golf fairway may be engraved into the lid 34. Alternatively, the lid 34 can be molded with different yardage numerals thereon. A hole in the lid 34 allows the winged lower end of a HUNTER® tool (not illustrated) to be inserted into a slotted hole 36a (FIG. 6) in the upper end of a cylindrical extension 36b of the service valve 36. The tool may be twisted to turn the service valve 36 between its AUTO, ON, and OFF states.

Figure 12:
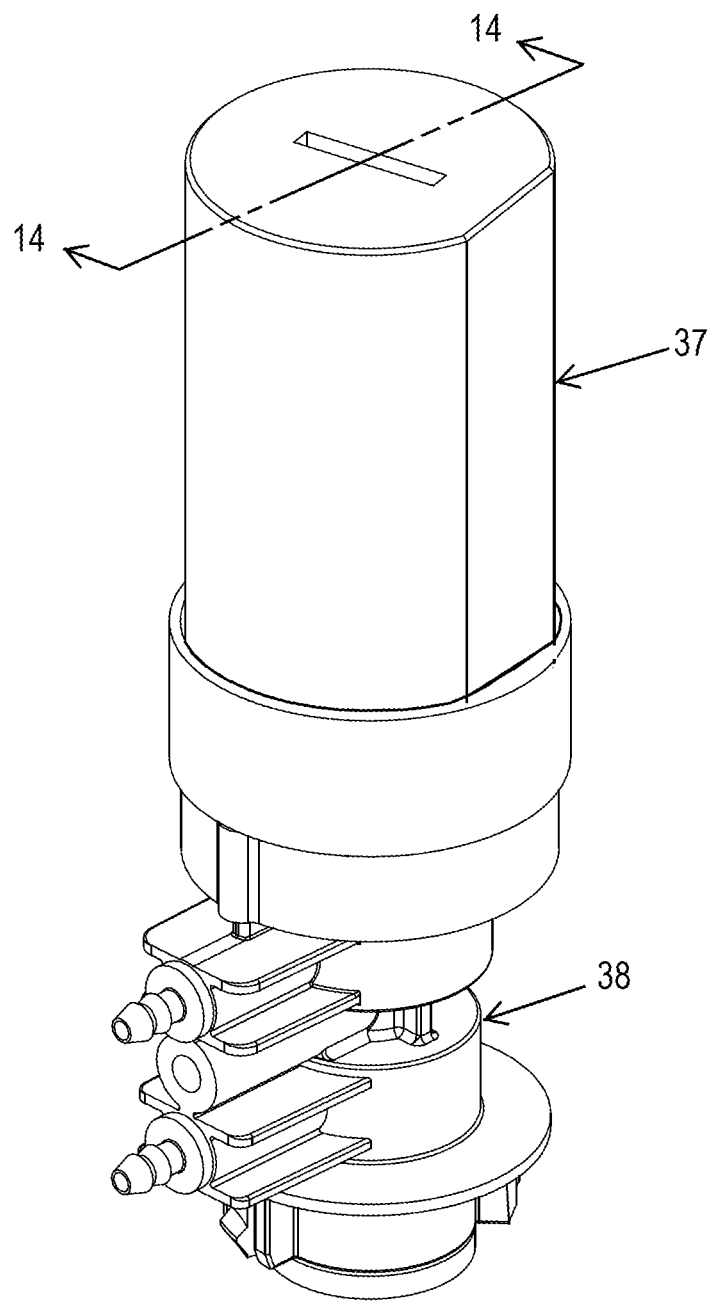
FIG. 12 is an enlarged isometric view of the solenoid and pilot valve assembly of the sprinkler of FIG. 1.
Figure 13:
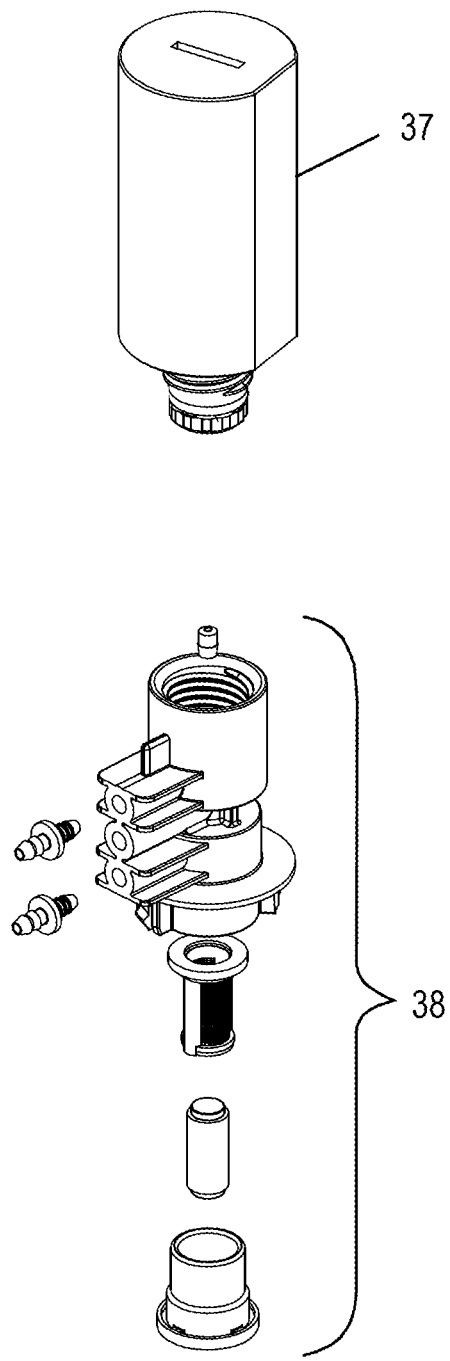
FIG. 13 is a reduced exploded isometric view of the solenoid and pilot valve assembly of FIG. 12.
Figure 14:
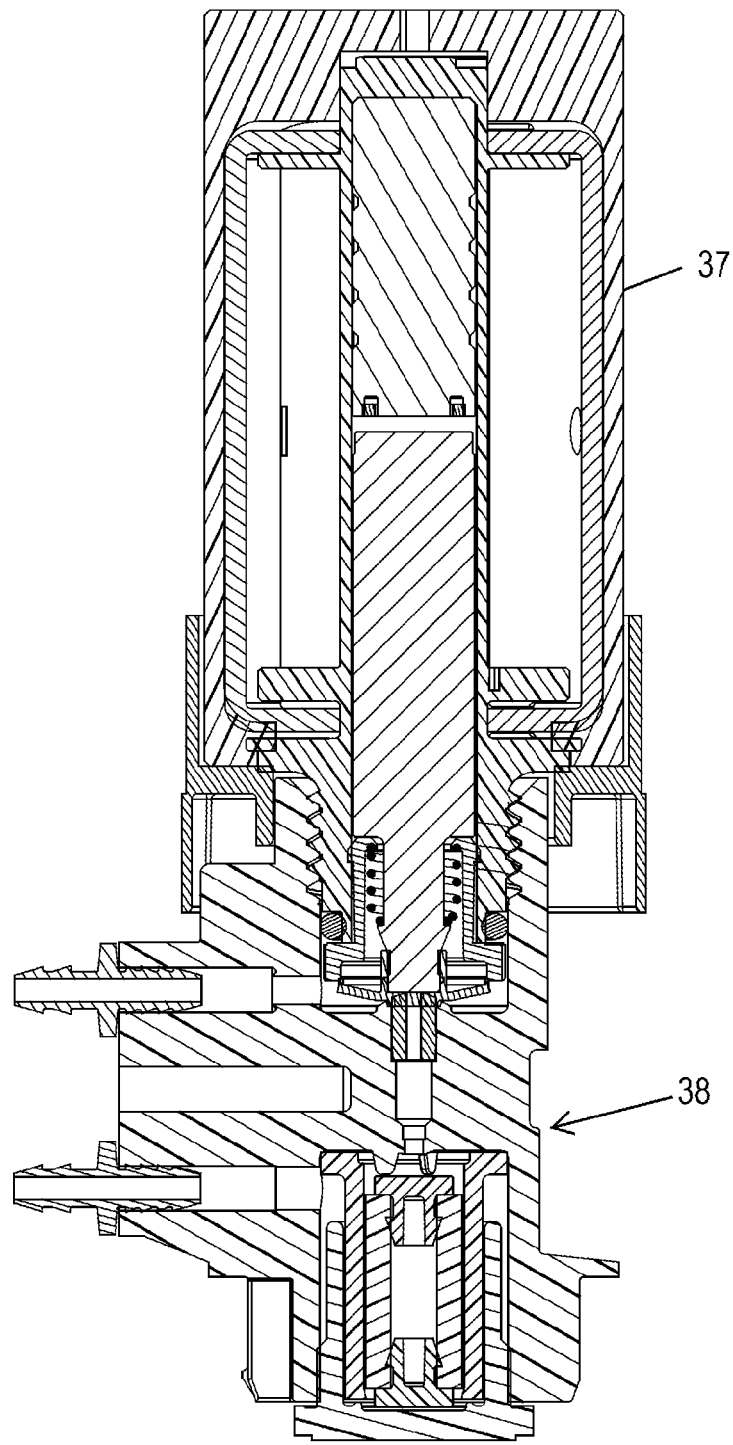
FIG. 14 is an enlarged vertical sectional view of the solenoid and pilot valve assembly of FIG. 12 taken along line 14-14 of FIG. 12.

Details of the solenoid 37 and pilot valve 38 are illustrated in FIGS. 12-14. The solenoid 37 and pilot valve 38 may have a construction similar to that illustrated in U.S. Pat. No. 5,979,482 granted Nov. 9, 1999 to Loren W. Scott entitled "Removable Captive Plunger with Contamination Protection" the entire disclosure of which is hereby incorporated by reference. A three-way pilot valve may also be used, such as disclosed in U.S. Pat. No. 7,503,346 granted Mar. 17, 2009 to Michael L. Clark entitled "Solenoid Actuated Pilot Valve for Irrigation System Valve" and the similarly entitled pending U.S. patent application Ser. No. 12/353,832 filed by Michael L. Clark et al. on Jan. 14, 2009, the disclosures of both of which are hereby incorporated by reference.

Details of the construction of the adjustable pressure regulator 42 are illustrated in FIG. 3. The adjustable pressure regulator 42 has a first barbed fitting 48 that is attached to the hose 40 for venting the adjustable pressure regulator 42 to ambient air pressure. A second barbed fitting 50 on the adjustable pressure regulator 42 is used for coupling the hose 44 (FIG. 2) that operatively connects the adjustable pressure regulator 42 to the pilot valve 38 and service valve 36 via the T-fitting 45 (FIG. 2) and the hoses 52 and 54, respectively.

Figure 6:
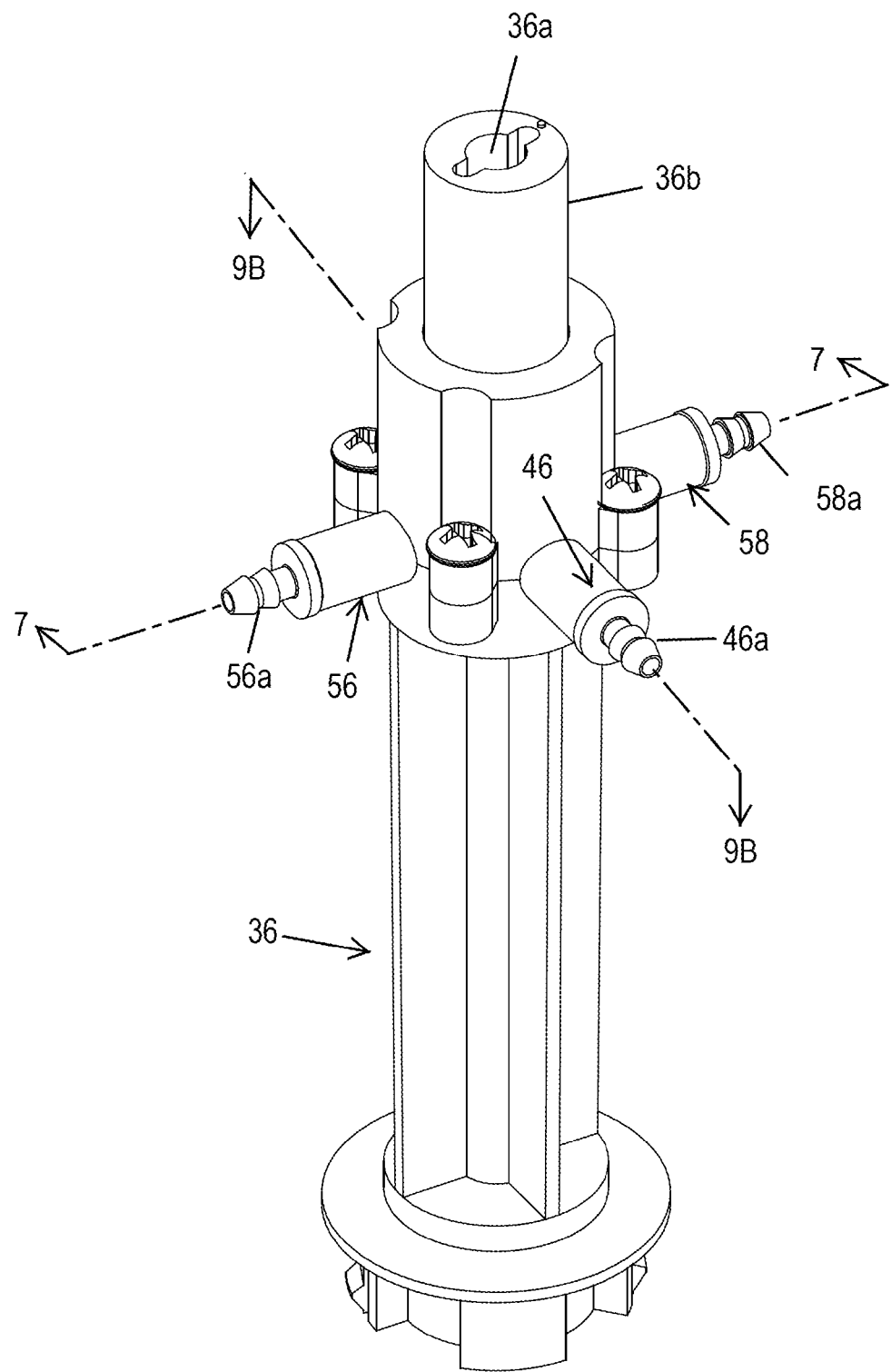
FIG. 6 is an enlarged isometric view of the 3-way service valve of the sprinkler of FIG. 1.
Figure 7:
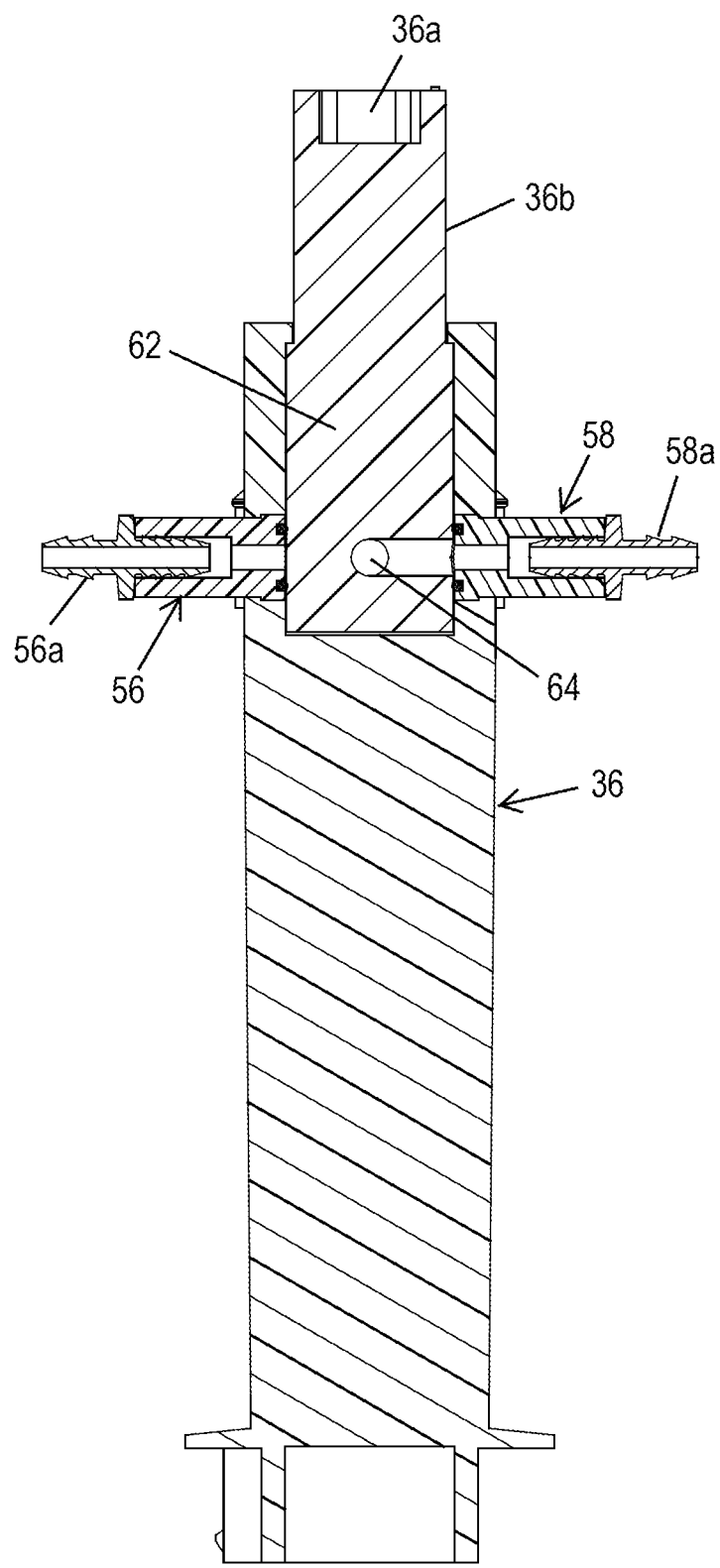
FIG. 7 is a vertical cross-sectional view of the 3-way service valve taken along line 7-7 of FIG. 6.

Details of the construction of the 3-way service valve 36 are illustrated in FIGS. 6-8. The 3-way service valve 36 has tubular ports 46, 56 and 58 (FIG. 6) that are equipped with barbed fittings 46a, 56a and 58a, respectively. The hose 54 (FIG. 2) is connected to the barbed fitting 46a for operatively coupling the 3-way service valve 36 to the pilot valve 38 and the adjustable pressure regulator 42 via the T-fitting 45 and the hoses 52 and 44. The hose 35 is connected to the barbed fitting 56a (FIG. 6) for operatively coupling the 3-way service valve 36 to the valve module 14 (FIG. 2). A hose 60 (FIG. 2) is connected to the barbed fitting 58a (FIG. 6) for operatively coupling the 3-way service valve 36 to the pilot valve 38.

Figure 9A:
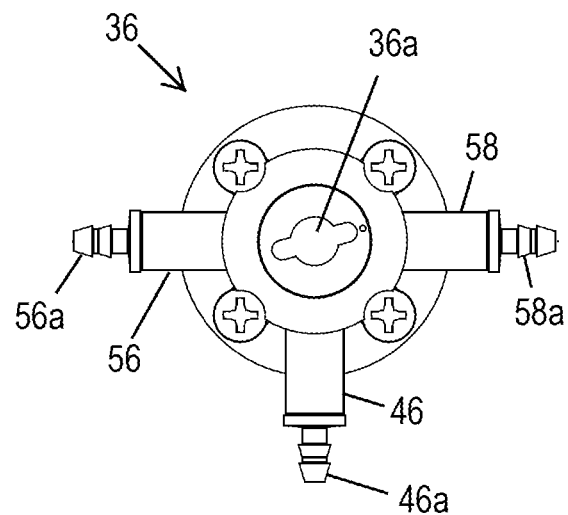
FIG. 9A is a top plan view of the 3-way service valve of FIG. 6 when the service valve is in its OFF state.
Figure 9B:
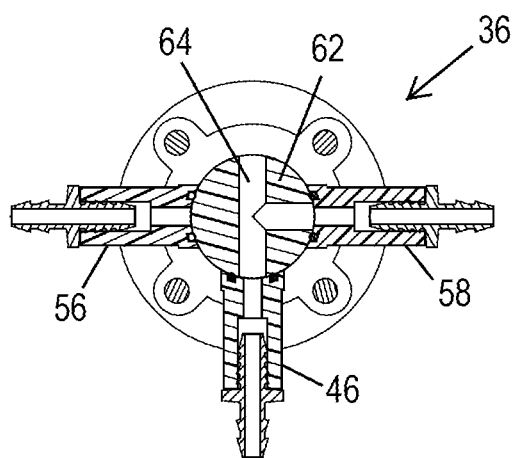
FIG. 9B is a horizontal sectional view of the 3-way service valve taken along line 9B-9B of FIG. 6 when the service valve is in its OFF state.

The 3-way service valve 36 includes a cylindrical valve member 62 (FIG. 8) with a T-shaped fluid communication passage 64 (FIG. 9B). The valve member 62 is mounted between a lower valve chamber section 68 (FIG. 8) and an upper valve chamber section 66 and is coupled to the lower end of the cylindrical extension 36b of the 3-way service valve 36. The 3-way service valve 36 thus has a valve chamber formed by upper and lower valve chamber sections 66 and 68. The valve chamber has a plurality of ports in the form of ports 46, 56 and 58. The valve member 62 is rotatable within the valve chamber to couple and de-couple selected ones of the ports 46, 56 and 58 via the fluid communication passage 64. The lower valve chamber section 68 is formed with half circle pockets 68a and 68b which mate with similar complementary half circle pockets (not illustrated) formed on the upper valve chamber section 66. When the upper and lower valve chamber sections 66 and 68 are assembled the smaller outer half circle pocket 68a and its complementary half circle pocket surround the main segment 58b of the port 58. The larger inner half circle pocket 68b and its complementary half circle pocket surround a flange 58c of the port 58. This configuration holds the port 58 in place when lower valve chamber section 68 and the upper valve chamber section 66 are assembled. An inner facing contoured surface 58d on the port 58 is shaped to conform to the cylindrical outer contour of the valve member 62. A groove 58e formed in the inner end of the main segment 58b is shaped with the same contour as the surface 58d and is shaped to surround an O-ring 59. When the lower valve chamber 68 section and the upper valve chamber section 66 are assembled, the O-ring 59 is held tightly in the groove 58e to provide a fluid impervious seal between the port 58 and the valve member 62. The other two ports 46 and 56 of the 3-way service valve 36 have the same construction for sealing against valve member 62 as just described in connection with the port 58. The configuration of the contoured surface 58d and the O-ring 59 provides a seal against the cylindrical outer surface of the valve member 62 and also maintains the port 58 in the proper radial orientation. The three way service valve 36 may be easily disassembled and reassembled for cleaning the interior valve surfaces and for replacing the O-rings 59 if required.

The state of the 3-way service valve 36 can be manually changed using the HUNTER® tool (not illustrated). The lower end of this tool is inserted into the slotted hole 36a (FIG. 6) in the upper end of a cylindrical extension 36b of the 3-way service valve 36. The tool is then twisted to rotate the cylindrical extension 36b and the valve member 62 between three different orientations. This operatively couples and de-couples the various components of the valve actuator component assembly 12 and the valve module 14 as illustrated in FIGS. 9A-11B to achieve three different modes of operation.

When the 3-way service valve 36 is in its OFF state illustrated in FIGS. 9A and 9B, the valve module 14 cannot vent to ambient air pressure and therefore the valve module 14 is kept closed and cannot admit water into the lower end of the outer housing 16 of the sprinkler 10. This allows service personnel to perform maintenance on the parts of the valve actuator component assembly 12 such as replacing the solenoid 37 and/or the pilot valve 38.

Figure 10A:
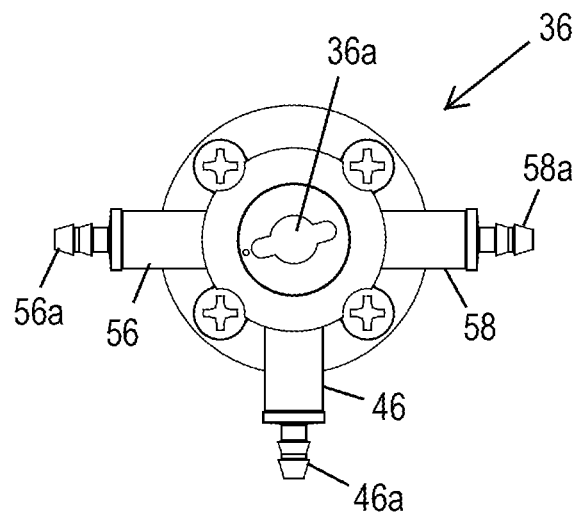
FIGS. 10A and 10B are views similar to FIGS. 9A and 9B, respectively, illustrating the configuration of the 3-way service valve in its ON state.
Figure 10B:
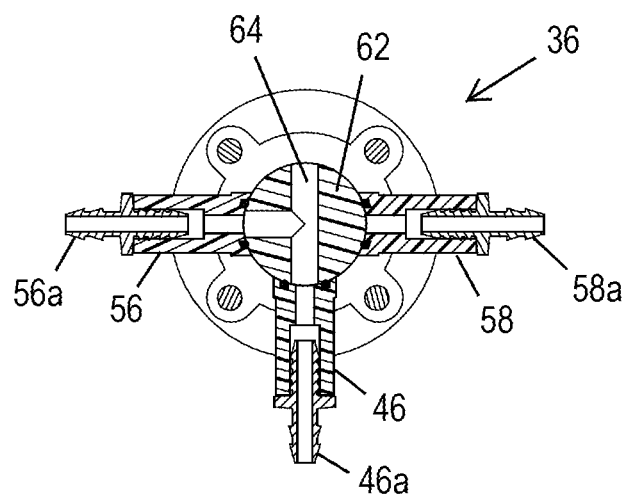

When the 3-way service valve 36 is in its ON state illustrated in FIGS. 10A and 10B, the valve module 14 vents directly to the adjustable pressure regulator 42. The valve module 14 is therefore opened and pressurized water is admitted into the lower end of the outer housing 16 of the sprinkler 10. The riser 20 extends and pressurized water is ejected from the nozzle turret 22 in the form of at least one long inclined stream of water. If the sprinkler 10 is not equipped with the adjustable pressure regulator 42, the valve module 14 is vented to ambient atmosphere when the service valve 36 is in the state illustrated in FIGS. 10A and 10B.

Figure 11A:
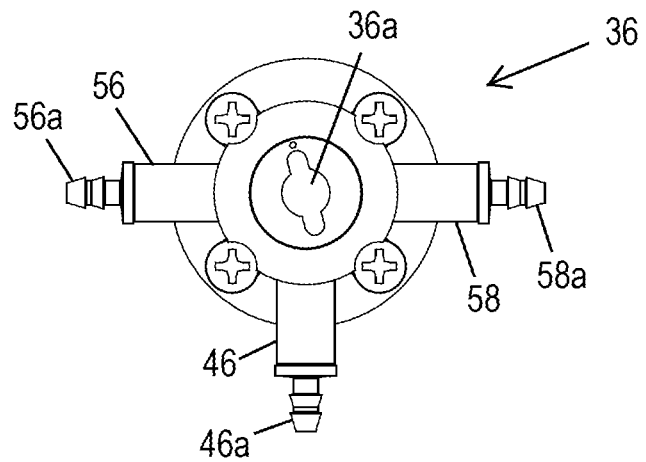
FIGS. 11A and 11B are views similar to FIGS. 9A and 9B, respectively, illustrating the configuration of the 3-way service valve in its AUTO state.
Figure 11B:
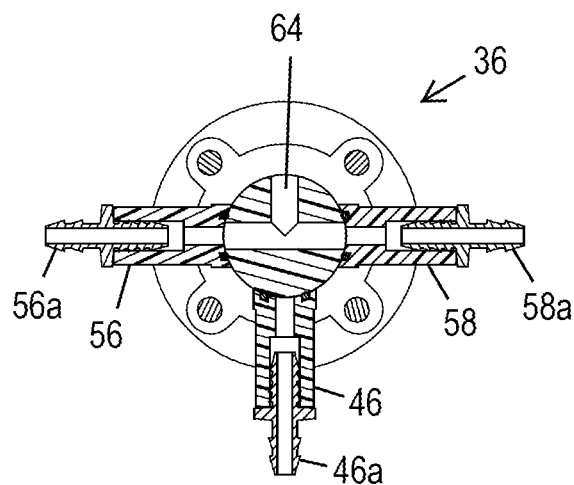

When the 3-way service valve 36 is in its AUTO state illustrated in FIGS. 11A and 11B, the pilot valve 38 opens to the pressure regulator 42 when the solenoid 37 is energized to open the valve module 14. The valve module 14 then vents directly to the adjustable pressure regulator 42. Pressurized water is only admitted into the lower end of the outer housing 16 of the sprinkler 10 when the solenoid 37 is energized. The riser 20 is then extended and pressurized water is ejected from the nozzle turret 22. This operation only occurs, however, where the irrigation controller sends a signal to the solenoid 37 to turn ON the sprinkler 10. If the sprinkler 10 is not equipped with the adjustable pressure regulator 42, the valve module 14 is vented to ambient atmosphere when the solenoid 37 is energized by the irrigation controller and the service valve 36 is in the state illustrated in FIGS. 11A and 11B.

Figure 15:
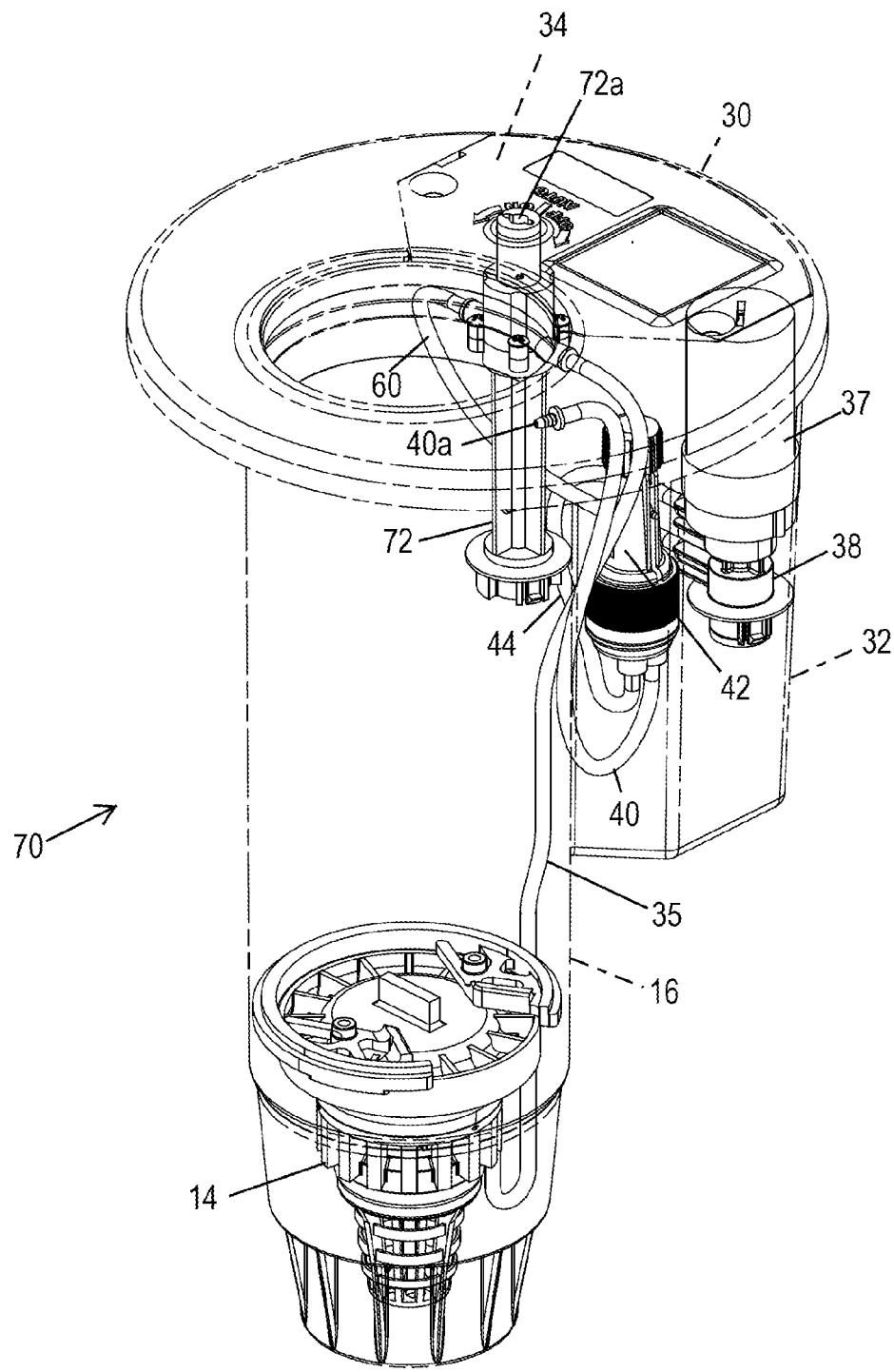
FIG. 15 is a view similar to FIG. 2 of a top serviceable sprinkler incorporating a second embodiment of the present invention that utilizes a 2-way service valve.
Figure 16:
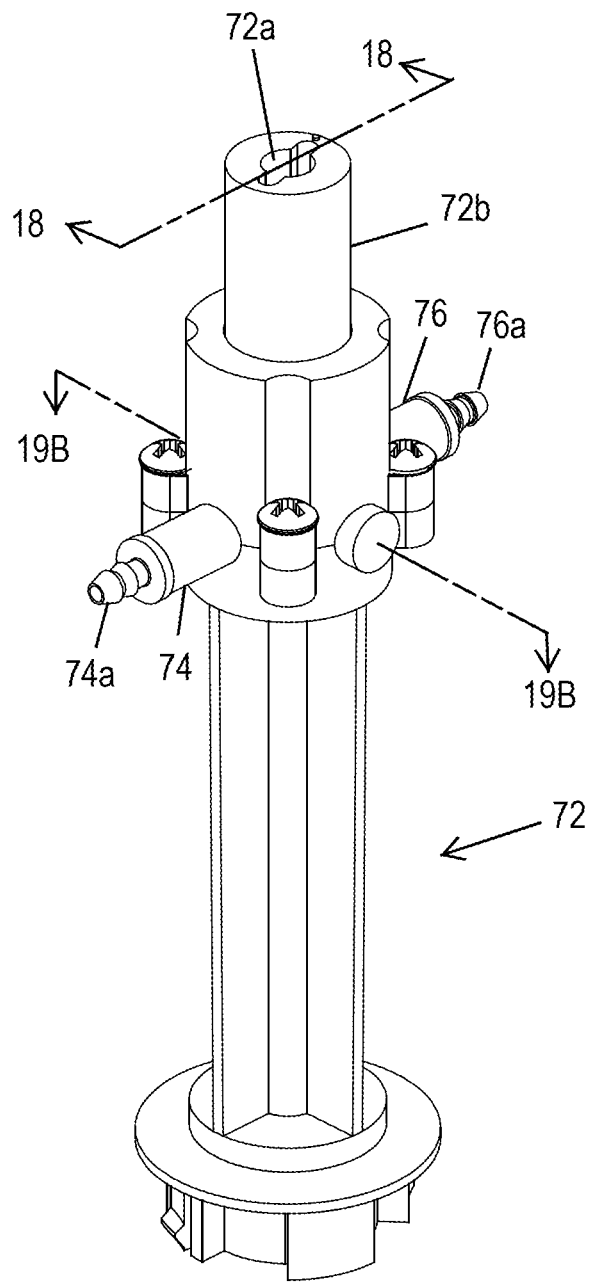
FIG. 16 is an enlarged isometric view of the 2-way service valve of the sprinkler of FIG. 15.
Figure 17:
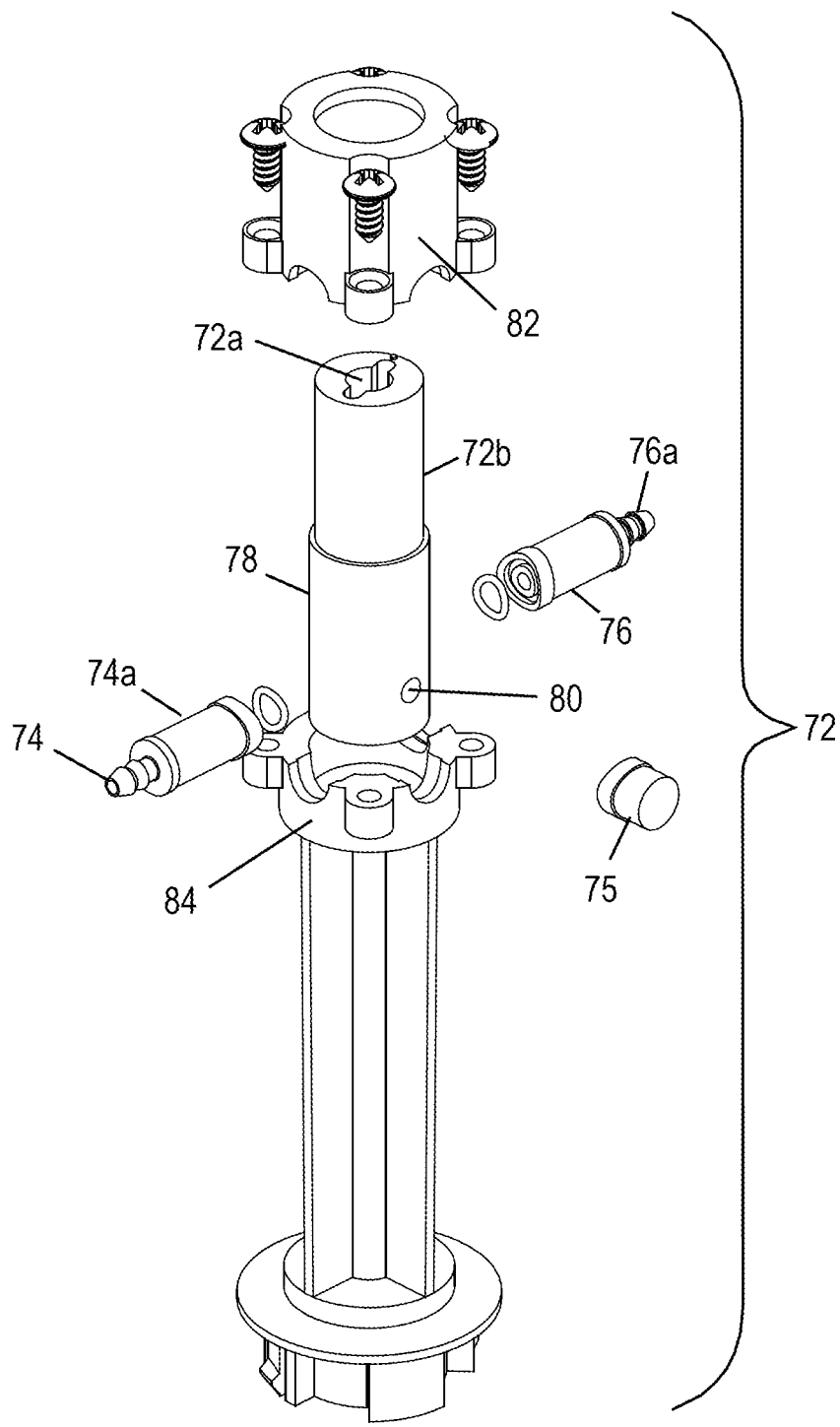
FIG. 17 is an exploded view of the 2-way service valve of FIG. 16.
Figure 18:
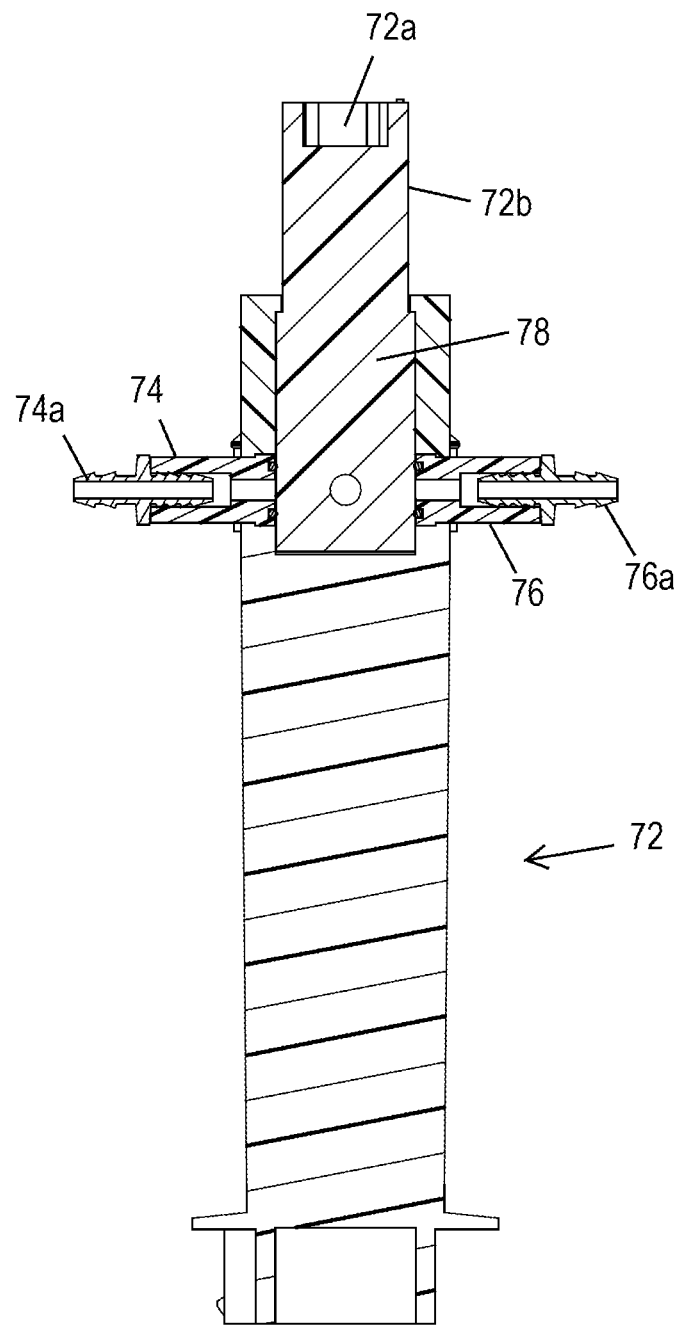
FIG. 18 is a vertical cross-sectional view of the 2-way service valve taken along line 18-18 of FIG. 16.

Referring to FIG. 15 a second embodiment of the present invention takes the form of a rotor-type sprinkler 70 that is similar to the sprinkler 10 except that the sprinkler 70 utilizes a 2-way service valve 72 instead of the 3-way service valve 36. Details of the construction of the 2-way service valve 72 are illustrated in FIGS. 16-18. The 2-way service valve 72 has diametrically positioned ports 74 and 76 (FIG. 16) that are equipped with barbed fittings 74a and 76a, respectively. The hose 35 is connected to the barbed fitting 74a for operatively coupling the 2-way service valve 72 to the valve module 14 (FIG. 2). The ports 74 and 76 are formed the same as ports 54 and 56 described earlier. The 2-way service valve 72 may use a plug 75 (FIG. 17) to block the hole formed between the upper and lower valve sections 82 and 84 where the port 46 is assembled in service valve 36. The valve chamber of the 2-way service valve 72 may alternatively be formed so that the plug 75 is not required. The hose 60 is connected to the barbed fitting 76a for operatively coupling the 2-way service valve 72 to the pilot valve 38. A hose 40 connects to a vent fitting 40a on the side of the housing 16 and to a first side of an adjustable pressure regulator 42. Another hose 44 connects a second side of the pressure regulator 42 to the pilot valve 38.

The 2-way service valve 36 includes a cylindrical valve member 78 (FIG. 19B) with a fluid communication passage 80. The valve member 78 is mounted within a valve chamber formed by joining a lower valve chamber section 84 and an upper valve chamber section 82 (FIG. 17). The valve member 78 is coupled to the lower end of the cylindrical extension 72b of the 2-way service valve 72. The state of the 2-way service valve 72 can be manually changed using the HUNTER® tool (not illustrated). The lower end of this tool is inserted into the slotted hole 72a (FIG. 16) in the upper end of the cylindrical extension 72b of the 2-way service valve 72. The tool is then twisted to rotate the cylindrical extension 72b and the valve member 78 between two different orientations. This operatively couples and de-couples the various components of the valve actuator component assembly 12 and the valve module 14 as illustrated in FIGS. 19A-20B to achieve two different modes of operation.

Figure 19A:
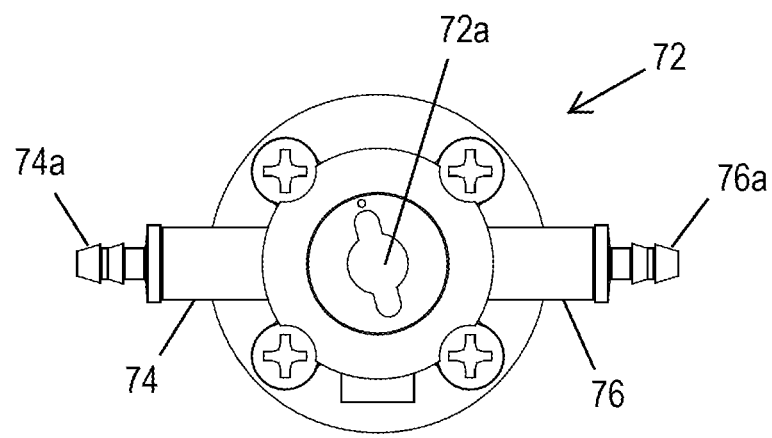
FIG. 19A is a top plan view of the 2-way service valve of FIG. 16 when the service valve is in its OFF state.
Figure 19B:
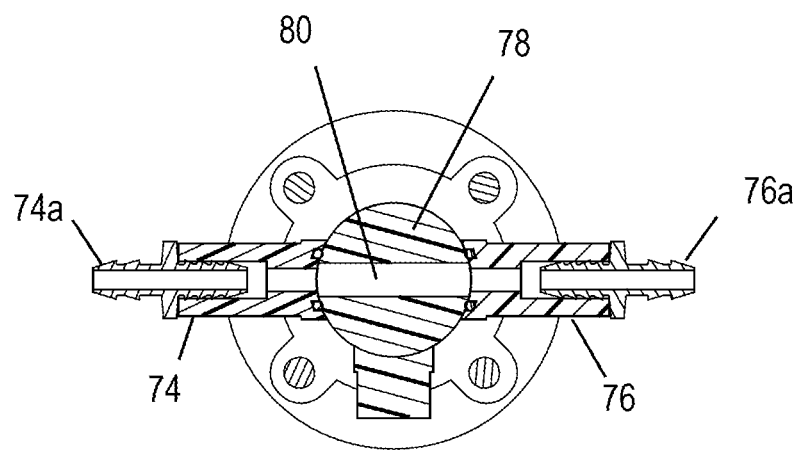
FIG. 19B is a horizontal sectional view of the 2-way service valve taken along line 19B-19B of FIG. 16 when the service valve is in its AUTO state.

When the 2-way service valve 72 is in its AUTO state illustrated in FIGS. 19A and 19B, the valve module 14 vents directly to the adjustable pressure regulator 42. The valve module 14 is operatively connected to the pilot valve 38. When the solenoid 37 is energized, the pilot valve 38 is positioned to allow the valve module to vent through the pressure regulator 42 and therefore open so pressurized water is admitted into the lower end of the outer housing 16 of the sprinkler 10. The riser 20 extends and pressurized water is ejected from the nozzle turret 22. If the sprinkler 70 is not equipped with the adjustable pressure regulator 42, the valve module 14 is vented to ambient atmosphere when the solenoid 37 is energized and the 2-way service valve 72 is in the state illustrated in FIGS. 19A and 19B.

Figure 20A:
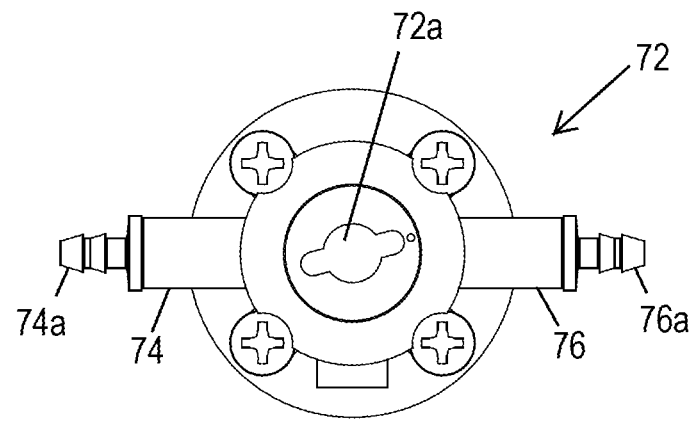
FIGS. 20A and 20B are views similar to FIGS. 19A and 19B, respectively, illustrating the configuration of the service valve in its OFF state.
Figure 20B:
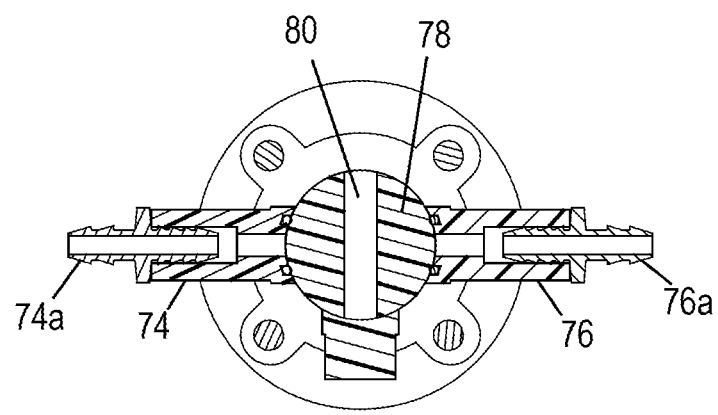

When the 2-way service valve 72 is in its OFF state illustrated in FIGS. 20A and 20B, the valve module 14 cannot vent to ambient air pressure and therefore the valve module 14 is kept closed and cannot admit water into the lower end of the outer housing 16 of the sprinkler 70. This allows service personnel to perform maintenance on the parts of the valve actuator component assembly 12 such as replacing the solenoid 37 and/or the pilot valve 38.

While two embodiments of a valve-in-head sprinkler with a service valve have been described in detail, it will be understood by those skilled in the art that the invention disclosed herein may be modified in both arrangement and detail. The sprinkler 20 may have the valve components arranged such that one or more of the components are not serviceable from the top. This may require excavation of the surrounding soil to access at least one of them. The configuration of the outer housing 16, the valve actuator component assembly 12, and the diaphragm valve module 14 could be varied. For example, a piston type valve could be used as the main valve in place of the diaphragm valve. The service valves 36 and 72 need not be operable with the lid 34 closed, but instead could require the lid 34 to be removed before the service valves 36 and 72 could be manually actuated. The sprinklers 10 and 70 need not include the adjustable pressure regulator 42, or they may include a pressure regulator that is not adjustable. The configurations of the 3-way service valve 36 and the 2-way service valve 72 could be widely varied. Therefore the protection afforded the invention should only be limited in accordance with the scope of the following claims.

What is claimed is:
1. An irrigation sprinkler, comprising:
an outer housing having an inlet at a lower end thereof;

a riser mounted inside the outer housing for vertical reciprocation through an opening in an upper end of the outer housing;
a nozzle mounted in an upper end of the riser for ejecting a stream of water;
a main valve mounted in the lower end of the outer housing for controlling the flow of water through the inlet;
a pilot valve operatively coupled to the main valve for turning the main valve ON and OFF;
a solenoid operatively coupled to the pilot valve for opening and closing the pilot valve; and
a service valve operatively coupled between the main valve and the pilot valve and manually actuable from an AUTO state to allow normal operation of the sprinkler and to an OFF state to allow repair or replacement of the pilot valve or solenoid without having to manually shut OFF a supply valve that is coupled to the inlet of the outer housing through a supply pipe.

2. The sprinkler of claim 1 wherein the main valve is a component of a valve module that is removable as a unit from the outer housing upon removal of the riser.

3. The sprinkler of claim 2 wherein the valve module includes a valve body, an elastomeric valve member supported by the valve body that has a portion that engages and disengages a valve seat to permit water to flow through the valve body.

4. The sprinkler of claim 1 wherein the main valve is a diaphragm valve.

5. The sprinkler of claim 1 and further comprising a drive assembly mounted in the riser for rotating the nozzle.

6. The sprinkler of claim 1 and further comprising a pressure regulator operatively coupled to the pilot valve.

7. The sprinkler of claim 1 and further comprising a valve actuator component assembly housing on an exterior side of the outer housing and enclosing the pilot valve, the solenoid and the service valve and permitting the service valve to be manually actuated between its ON and OFF states from a top side of the outer housing.

8. The sprinkler of claim 1 and further comprising at least one valve actuator component assembly housing on an exterior side of the outer housing and enclosing at least one of the pilot valve, the solenoid and the service valve.

9. The sprinkler of claim 1 and further comprising a valve actuator component assembly housing on an exterior side of the outer housing, the valve actuator component housing enclosing the pilot valve, the solenoid and the service valve, a ground support flange extending from an upper end of the outer housing, and a removable lid covering an opening at an upper end of the valve actuator component assembly housing.

10. The sprinkler of claim 9 wherein the lid has an aperture through which a tool may be inserted in order to actuate the service valve between its AUTO and OFF states.

11. An irrigation sprinkler, comprising:
an outer housing having an inlet at a lower end thereof;
a riser mounted inside the outer housing for vertical reciprocation through an opening in an upper end of the outer housing;
a nozzle mounted in an upper end of the riser for ejecting a stream of water;
a main valve mounted in the lower end of the outer housing for controlling the flow of water through the inlet;
a pilot valve operatively coupled to the main valve for turning the main valve ON and OFF;
a solenoid operatively coupled to the pilot valve for opening and closing the pilot valve; and
a service valve operatively coupled between the main valve, and the pilot valve and manually actuable from an AUTO state to allow normal operation of the sprinkler to an OFF state to allow repair or replacement of the pilot valve, solenoid or pressure regulator without having to manually shut OFF a supply valve that is coupled to the inlet of the outer housing through a supply pipe, the service valve being further manually actuable to an ON state to turn the main valve ON to allow the sprinkler to be tested.

12. The sprinkler of claim 11 wherein the service valve includes a valve chamber having a plurality of ports, and a valve member formed with a fluid communication passage and rotatable within the valve chamber to couple and de-couple selected ones of the ports.

13. The sprinkler of claim 12 wherein the ports each have an inner end with a contoured surface shaped to conform to an outer surface of the valve member and an O-ring seated in a groove for providing a substantially fluid impervious seal between the port and the valve member.

14. The sprinkler of claim 11 and further comprising a drive assembly mounted in the riser for rotating the nozzle.

15. The sprinkler of claim 12 wherein the valve module includes a valve body, a valve seat connected to the valve body, and an elastomeric valve member supported by the valve body that has a portion that engages and disengages the valve seat to permit water to flow through the ribs and around the valve body.

16. The sprinkler of claim 11 and further comprising a valve actuator component assembly housing on an exterior side of the outer housing and enclosing the pilot valve, the solenoid, the pressure regulator and the service valve and permitting the service valve to be manually actuated between its AUTO, OFF and ON states from a top side of the outer housing.

17. The sprinkler of claim 11 and further comprising a valve actuator component assembly housing on an exterior side of the outer housing and enclosing the pilot valve, the solenoid, the pressure regulator and the service valve.

18. The sprinkler of claim 11 and further comprising at least one valve actuator component assembly housing on an exterior side of the outer housing, the valve actuator component housing enclosing at least one of the pilot valve, the solenoid, a pressure regulator, and the service valve; a ground support flange extending from an upper end of the outer housing, and at least one removable lid covering an opening at an upper end of the valve actuator component assembly housing.

19. The sprinkler of claim 18 wherein the lid has an aperture through which a tool may be inserted in order to actuate the service valve between its AUTO, OFF and ON states.

20. In a valve-in-head irrigation sprinkler including an outer housing having an inlet at a lower end thereof, a riser mounted inside the outer housing for vertical reciprocation through an opening in an upper end of the outer housing, a nozzle mounted in an upper end of the riser for ejecting a stream of water, a drive assembly mounted in the riser for rotating the nozzle, a main valve mounted in the lower end of the outer housing for controlling the flow of water through the inlet, a pilot valve operatively coupled to the main valve for turning the main valve ON and OFF, a solenoid operatively coupled to the pilot valve for opening and closing the pilot valve, the improvement comprising a service valve operatively coupled between the main valve and the pilot valve, and manually actuable from an AUTO state to allow normal operation of the sprinkler to an OFF state to allow repair or replacement of the pilot valve or solenoid without having to manually shut OFF a supply valve that is coupled to the inlet of the outer housing through a supply pipe, the service valve being further manually actuable to an ON state to turn the main valve ON to allow the sprinkler to be tested.

\* \* \* \* \*